J. S. SURBAUGH.
COAL DRILL.
APPLICATION FILED APR. 12, 1906.

914,893.

Patented Mar. 9, 1909.

Witnesses:
Chas. S. Lepley.
Henry Sens.

Inventor:
John S. Surbaugh
by C. M. Clarke
his Attorney

THE NORRIS PETERS CO., WASHINGTON, D. C.

UNITED STATES PATENT OFFICE.

JOHN S. SURBAUGH, OF TERRE HAUTE, INDIANA.

COAL-DRILL.

No. 914,893.  Specification of Letters Patent.  Patented March 9, 1909.

Application filed April 12, 1906. Serial No. 311,344.

*To all whom it may concern:*

Be it known that I, JOHN S. SURBAUGH, a citizen of the United States, residing at Terre Haute, in the county of Vigo and State of Indiana, have invented certain new and useful Improvements in Coal-Drills, of which the following is a specification, reference being had therein to the accompanying drawings, forming part of this specification.

My invention relates to improvements in mechanism for coal drills of that class used for drilling into the faces of coal, rock, etc., and particularly refers to the mounting of the interiorly threaded two-part nut or boxing through which passes the threaded drill-actuating screw. In devices of this class the wear of the gears is usually severe owing to the presence of grit or dust, and my invention relates to the construction of the threaded boxing and its incorporation with the boxing or gearing frame to which it is secured by a hinge rod or bolt, and adapted for easy insertion or removal of the threaded shaft or its boxing and renewal of the latter.

Figure 1:
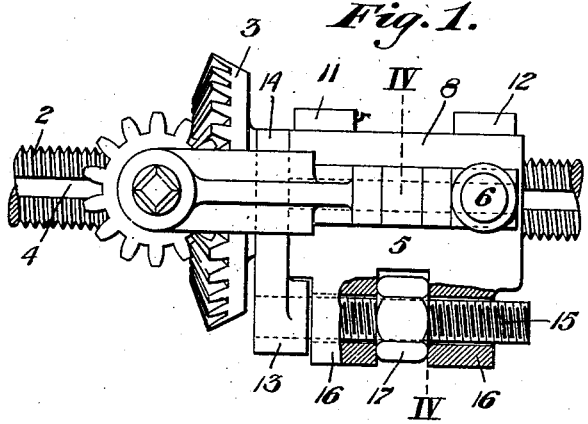
Figure 2:
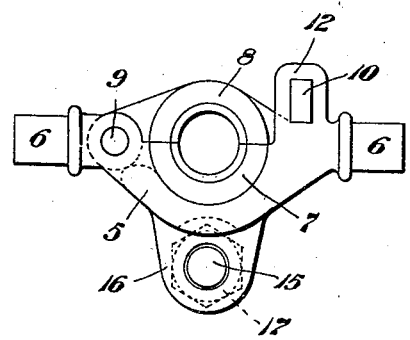
Figure 3:
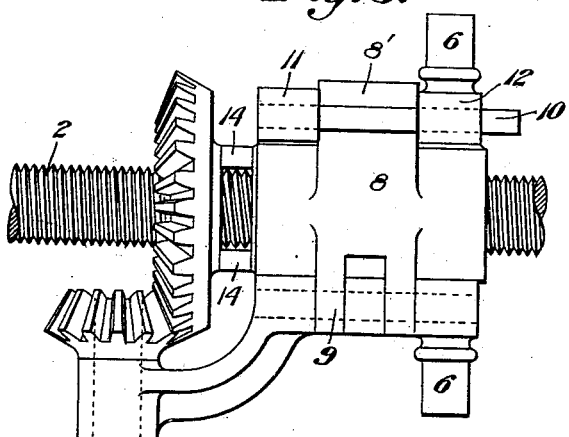
Figure 4:
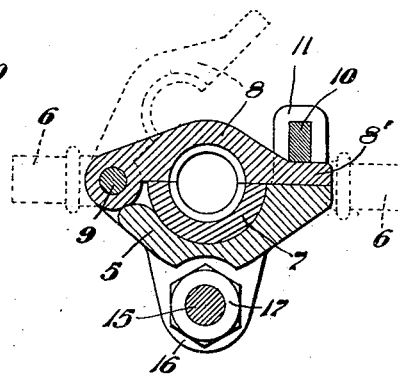
Figure 5:
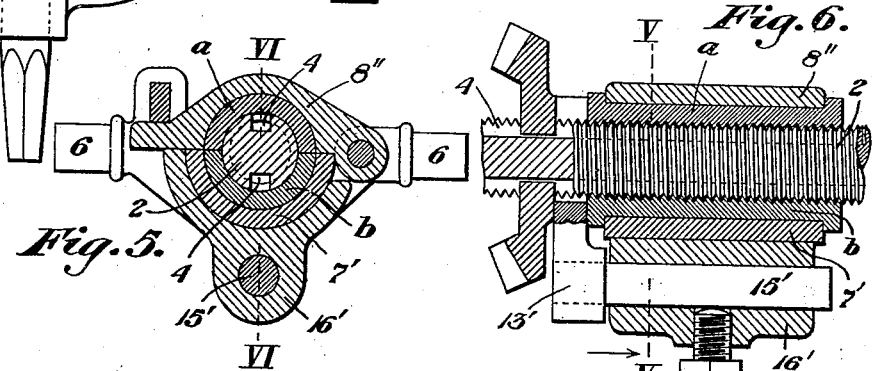
Figure 6:
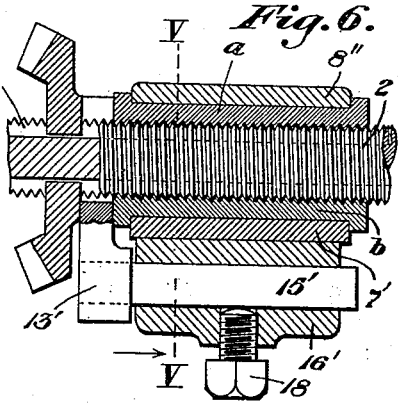

Referring now to the drawings:—Figure 1 is a view of the boxing in side elevation, partly broken away. Fig. 2 is an end view of Fig. 1. Fig. 3 is a plan view of Fig. 1. Fig. 4 is a cross section on the line IV. IV. of Fig. 1, the trunnion bearings being indicated in dotted lines. Fig. 5 is a view similar to Fig. 4 but showing the separable boxing provided with a two-part threaded bushing, indicated by the section V. V. of Fig. 6. Fig. 6 is a longitudinal vertical section on the line VI. VI. of Fig. 5.

In drilling apparatus of the character to which my invention is applied, the drill (not shown) is connected at one end of a threaded spline shaft 2 with which a driven gear 3 is in constant rotating engagement by means of one or more inwardly extending splines or keys engaging the longitudinal slot or slots or keyways 4.

5 is the main supporting frame provided with any suitable mounting as trunnion bearings 6.

Forward motion is imparted to the screw and drill by means of a surrounding interiorly threaded box, which may consist of two separable halves 7, 8, hinged together and to the frame, as shown in the principal figures of the drawing, said halves or one of them having the thread chased in themselves, or provided with inserted threaded bushings as in Figs. 5 and 6.

Referring to Figs. 1, 2, 3 and 4, one half 8 of the box is hinged at 9 on a hinge rod mounted in suitable lugs extending from the frame 5 and is secured at the other side by means of a key 10 engaging an extension 8' of part 8 and keepers 11, 12, of the frame, as shown, or by any other suitable means.

Ordinarily the driven gear 3 abuts, by its hub or back face, immediately against the adjacent face of the threaded box, but I have provided an adjusting yoke 13 arranged to embrace the shaft 2 by its arms 14, 14, as shown in Fig. 3, said yoke being provided with a stem 15. As shown in Fig. 1 said stem is threaded and passes freely through suitable supporting lugs 16, 16, depending from the frame 5 at its under side.

The stem 5 is provided with an adjusting nut 17 inserted within a suitable receiving cavity between the lugs 16 and having a somewhat tight fit upon the threaded stem. By adjusting this nut it will be seen that the yoke 13 may be correspondingly adjusted, and with it the driven gear 3, so that any wear may be readily compensated for, and such adjustment is thereby rendered comparatively delicate.

The threaded engagement with the shaft and the application of the adjusting yoke is not limited to a separable box of the exact construction shown in Fig. 1 to 4 nor is its adjustment confined to the construction employing the threaded stem and nut. In Figs. 5 and 6 I have shown the feed screw nut composed of two separable internally threaded bushings *a*, *b*, mounted in recesses within the hinged sides 7' and 8'' and the stem 15' carrying the yoke 13' is secured within a suitable receiving lug 16' and capable of adjustment therein in any suitable manner, as by tapping its end with a hammer or by manual adjustment. Any convenient means for securing the stem 15' in position may be employed, as for instance a set screw 18 as shown in Fig. 6.

By either construction the top half of the threaded boxing may be thrown up on its hinge joint or both halves and also the bushings when used may be removed or detached entirely from the main gear frame 5 by merely withdrawing the hinge pin 9.

Various other forms, designs, or adaptations of the invention may be substituted by the skilled mechanic, and I do not wish to be limited to the specific construction or arrangement shown but to include all such changes or variations as are within the scope of the following claims.

What I claim is:

1. In a gear box for drill screws, the combination of a supporting frame, a separable two-part boxing hinged together and to the frame and provided with threads, a splined screw shaft passing through the boxing, a driving gear and means for actuating it, and a driven gear meshing therewith and in spline engagement with the screw shaft, substantially as set forth.

2. In a gear box for drill screws, the combination of the outer frame, a separable two-part internally threaded boxing hinged together and to the frame, a splined screw shaft passing through the boxing, a driving gear and means for actuating it, and a driven gear meshing therewith and in spline engagement with the screw shaft, substantially as set forth.

3. In a gear box for drill screws, the combination of the outer frame provided with hinge bearings and a driving gear bearing; a separable two-part boxing hinged together and to the frame by said bearings, and provided with interior shaft-engaging threads, a splined screw shaft passing through the boxing and engaging said threads, a driving gear and its shaft mounted in the driving gear bearings, and a driven gear meshing therewith and in spline engagement with the screw shaft, substantially as set forth.

4. In a gear box for drill screws, the combination of the outer casing provided with hinge bearing portions, a separate two-part boxing of an upper and lower portion hinged together and to said bearings and provided with interior threads, and a securing device for holding the boxing in a closed position, substantially as set forth.

5. In a gear box for drill screws, the combination of an outer frame provided with laterally extending trunnion bearings and hinge bearing portions, a separable two-part boxing consisting of an upper and a lower portion hinged together and to said bearings and provided with interior threads, and a securing device for holding the boxing in a closed position, substantially as set forth.

6. In a gear box for drill screws, the combination of an outer frame provided with laterally extending trunnion bearings and hinge bearing portions and an integral driving gear bearing, a separable two-part boxing consisting of an upper and lower portion hinged together and to said bearings and provided with interior threads, and a securing device for holding the boxing in a closed position, substantially as set forth.

7. In a gear box for drill screws, the combination with the frame, of a two-part internally threaded boxing hinged to said frame, substantially as set forth.

8. In a gear box for drill screws, the combination with the frame, of a separable two-part internally threaded boxing hinged together and to said frame, substantially as set forth.

9. In a gear box for drill screws, the combination with the frame provided with supporting trunnions, of a separable two-part internally threaded boxing hinged to said frame, substantially as set forth.

10. In a gear box for drill screws, the combination with the frame provided with key-engaging lugs; of a separable two-part internally threaded boxing hinged to said frame, and having a portion adapted to be engaged by a key held in said lugs, substantially as set forth.

11. The combination with a supporting structure, of a frame having supporting trunnions mounted in said structure and a laterally arranged driving gear bearing, a driving gear and its operating shaft mounted therein, a two-part separable internally threaded boxing hinged together and to said frame, a splined screw shaft mounted in said boxing, and a driven gear in splined engagement with said shaft and in mesh with said driving gear, substantially as set forth.

In testimony whereof I affix my signature in presence of two witnesses.

JOHN S. SURBAUGH.

Witnesses:
THEODORE C. SMITH,
J. W. CALLAHAN.